United States Patent
Nakajima

(10) Patent No.: US 12,277,460 B2
(45) Date of Patent: Apr. 15, 2025

(54) PRINTER REGISTERING SET OF GLYPH DATA IN GLYPH INDEX TABLE AND USING THE SET OF GLYPH DATA WHEN GENERATING RASTER DATA

(71) Applicant: BROTHER KOGYO KABUSHIKI KAISHA, Nagoya (JP)

(72) Inventor: Kenshiro Nakajima, Kani (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/397,339

(22) Filed: Dec. 27, 2023

(65) Prior Publication Data
US 2024/0256811 A1    Aug. 1, 2024

(30) Foreign Application Priority Data
Feb. 1, 2023  (JP) ................................ 2023-013796

(51) Int. Cl.
*G06K 15/02*   (2006.01)
*G06F 3/12*    (2006.01)

(52) U.S. Cl.
CPC ....... *G06K 15/1827* (2013.01); *G06F 3/1204* (2013.01); *G06F 3/121* (2013.01); *G06F 3/1212* (2013.01); *G06F 3/1248* (2013.01); *G06F 3/1257* (2013.01); *G06K 15/1838* (2013.01)

(58) Field of Classification Search
USPC ........................................................ 358/1.11
See application file for complete search history.

(56) References Cited

U.S. PATENT DOCUMENTS

| | | | |
|---|---|---|---|
| 2005/0094172 A1* | 5/2005 | Engelman | G06F 3/1243 358/1.11 |
| 2005/0094173 A1* | 5/2005 | Engelman | G06F 3/1243 358/1.11 |
| 2011/0063671 A1 | 3/2011 | Akahane | |

FOREIGN PATENT DOCUMENTS

JP     2014056583 A    3/2014

* cited by examiner

*Primary Examiner* — Darryl V Dottin
(74) *Attorney, Agent, or Firm* — Scully, Scott, Murphy & Presser, PC

(57) ABSTRACT

In a printer, a controller builds a glyph index table in which no glyph data is registered. When it is determined that no set of glyph data corresponding to a character code selected in print data is registered in the glyph index table, the controller acquires a target set of glyph data from the font information in a memory. The target set of glyph data corresponds to the character code. The controller registers the target set of glyph data in the glyph index table. When it is determined that the set of glyph data corresponding to the character code is registered in the glyph index table, the controller acquires the target set of glyph data from the glyph index table. The controller generates raster data from the print data using the target set of glyph data, and perform a printing process to print an image based on the raster data.

10 Claims, 11 Drawing Sheets

PRINTER REGISTERING SET OF GLYPH DATA IN GLYPH INDEX TABLE AND USING THE SET OF GLYPH DATA WHEN GENERATING RASTER DATA

REFERENCE TO RELATED APPLICATIONS

This application claims priority from Japanese Patent Application No. 2023-013796 filed on Feb. 1, 2023. The entire content of the priority application is incorporated herein by reference.

BACKGROUND ART

There is a printer that can perform printing based on print data described in a page description language. Such a printer stores font information for various outline fonts in correspondence with typefaces. The printer uses such built-in fonts for printing. There is also a known technology in which a printer has font replacement information that associates a font designated by a host computer with a built-in font prestored on the printer. In this technology, the printer is configured to replace the designated font with a built-in font on the basis of this font replacement information.

SUMMARY

In the conventional technology described above, the printer perform printing after replacing fonts designated by the host computer with built-in fonts. However, no conventional technology considers a case in which the printer downloads outline fonts not included among the built-in fonts from an external device and uses these downloaded fonts for printing. Since some downloaded fonts could contain data for more than ten thousand glyphs, the printer might require some time to download the fonts before printing can begin. Accordingly, the conventional technology has room for improvement.

In view of the foregoing, it is an object of the present disclosure to provide a printer. The printer includes a first memory, a second memory, and a controller. The first memory is a nonvolatile memory and the second memory is a volatile memory. The controller is configured to perform: acquiring print data written in a page description language, the print data representing an image including a character, wherein a character code of the character and a font used for representing the character are selected in the print data; copying the font information from the first memory to the second memory when font information on the font selected in the print data is stored in the first memory, the font information including a plurality of sets of glyph data each specifying an outline of a corresponding character for the font; a first building process to build, in the second memory, a glyph index table in which no set of glyph data is registered, wherein each of the plurality of sets of glyph data can be registered in the glyph index table; a first determination process to determine whether a set of glyph data corresponding to the character code selected in the print data is registered in the glyph index table; a first glyph data acquiring process on a first condition including a condition that the first determination process determines that no set of glyph data corresponding to the character code is registered in the glyph index table, the first glyph data acquiring process being to acquire a target set of glyph data from the font information in the second memory, the target set of glyph data being the set of glyph data corresponding to the character code; registering the target set of glyph data acquired in the first glyph data acquiring process in the glyph index table when the first glyph data acquiring process is performed; a second glyph data acquiring process on a second condition that the first determination process determines that the set of glyph data corresponding to the character code is registered in the glyph index table, the second glyph data acquiring process being to acquire the target set of glyph data from the glyph index table; a rasterizing process to generate raster data based on the print data using the target set of glyph data; and a printing process to print an image based on the raster data.

In the above structure, the printer, which can perform printing based on print data written in a page description language, can reduce a wait time until printing starts.

DESCRIPTION

Below, a printer according to an embodiment will be described in detail while referring to the accompanying drawings. This embodiment discloses a printer capable of printing based on print data described in a page description language (PDL).

Figure 1:
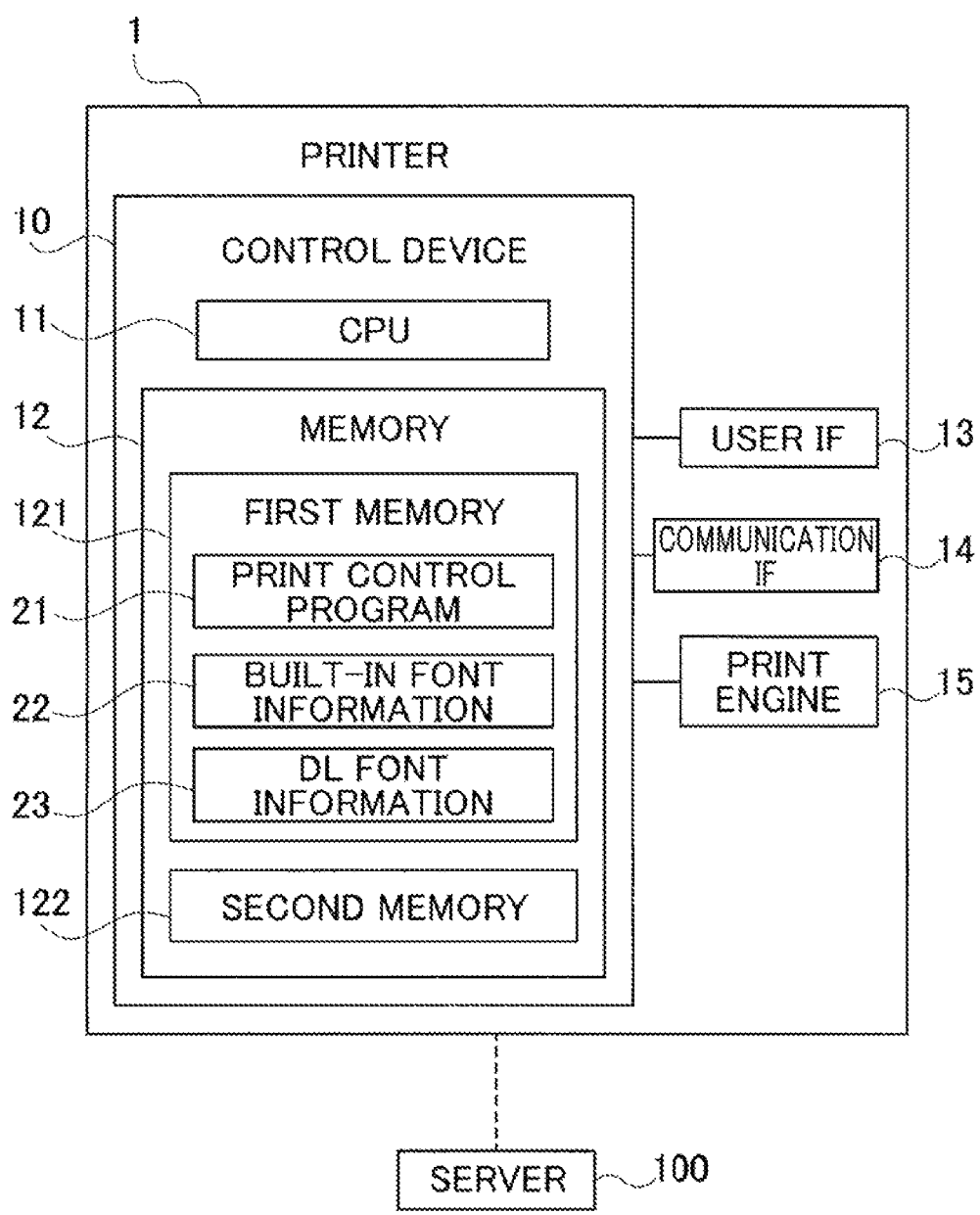
FIG. 1 is a block diagram illustrating an overview of a printer.

FIG. 1 shows a printer 1 according to the present embodiment. The printer 1 is provided with a control device 10 that includes a CPU 11 and a memory 12. The printer 1 is also provided with a user interface (also abbreviated as "user IF") 13, a communication interface (also abbreviated as "communication IF") 14, and a print engine 15. The user interface 13, the communication interface 14, and the print engine 15 are all electrically connected to the control device 10. Note that the control device 10 in FIG. 1 is a collective term that covers all hardware and software used for controlling the printer 1 and is not actually limited to representing a single piece of hardware present in the printer 1. The CPU 11 is an example of a controller. The control device 10 is another example of the controller.

The CPU 11 executes various processes, according to programs read from the memory 12 or on the basis of user operations. The memory 12 stores various programs and various data. The memory 12 is used as a work area for executing various processes. The memory 12 may include a buffer provided by the CPU 11.

An example of the memory 12 is a storage medium from which the CPU 11 can read data and to which the CPU 11 can write data (an example of the memory), in addition to the ROM, RAM, HDD provided in the printer 1. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The user interface 13 includes hardware that displays screens for reporting information to the user, and hardware that receives operations performed by the user. The user interface 13 may include a touchscreen or a combination of a display and operation buttons.

The communication interface 14 includes hardware for communicating with an external device. The communication standard employed by the communication interface 14 may be Ethernet, Wi-Fi (U.S. trademark of Wi-Fi Alliance CORPORATION), Universal Serial Bus (USB), or the like. Alternatively, the printer 1 may be provided with a plurality of communication interfaces 14 supporting a plurality of communication standards. The communication interface 14 may be a network interface.

The print engine 15 includes a device capable of printing based on image data according to the electrophotographic or inkjet method, for example. The print engine 15 may be provided with colorants of a plurality of colors to be able to execute color printing or may be provided with colorant in a single color for monochrome printing. In other words, the print engine 15 may be a print engine that can perform printing according to the electrophotographic method or the inkjet method.

The memory 12 includes a nonvolatile first memory 121, and a volatile second memory 122 such as a random-access memory (RAM). FIG. 1 shows the state of the printer 1 prior to being started up. In this state, the first memory 121 stores a print control program 21, built-in font information 22, and downloaded font information (hereinafter "DL font information") 23, for example. The built-in font information 22 and the DL font information 23 each contain a plurality sets of glyph data for respective ones of a plurality of characters. A set of glyph data is information specifying the outline of each character. The built-in font information 22 is an example of a built-in information and the DL font information 23 is an example of font information.

The built-in font information 22 is font information on built-in fonts and is stored in the memory 12 when the printer 1 is shipped from the factory.

The DL font information 23 is font information on downloaded fonts (hereinafter called "DL fonts") and is not stored on the printer 1 when the printer 1 is shipped from the factory. After being shipped from the factory, the printer 1 can download information on DL fonts separate from the built-in font information 22 in response to user instruction, for example, and can store the downloaded information as the DL font information 23. In other words, the DL font information is font information for additional fonts.

As shown in FIG. 1, the printer 1 can communicate with a server 100 via the communication interface 14. The server 100 is provided with font information. The printer 1 can download font information from the server 100. The user may also connect USB memory storing the DL font information 23 to the printer 1, enabling the printer 1 to use the DL font information 23. The DL font information 23 may be provided in various formats including TrueType fonts, OpenType fonts, and PostScript fonts. The server 100 is an example of an external device.

Operations of the printer 1 will be described. Following processes are basically processes performed by the CPU 11 according to programs. The processes performed by the CPU 11 include processes that control hardware through an Application Programming Interface (API) provided in an Operating System (OS) of the printer 1. In the present disclosure, the description of the OS may be omitted when the operations of each program performed using the OS are described. Note that the term "acquire" in this specification is used as a concept that does not necessarily require a request. Further, "data" is treated as the same data even when the format (such as a text format, binary format, or flag format) is modified, provided that content of the data is essentially the same.

The printer 1 can acquire print data written in a page description language and can perform printing based on the acquired print data. The print data described in a page description language includes information on characters to be printed, such as, a typeface (or a font name) indicating a particular style of lettering, character code, character size, and character color for each character. That is, in this disclosure, the formats, such as, TrueType fonts, OpenType fonts, and PostScript fonts, indicate formats of files that define corresponding fonts using a plurality of sets of glyph data, and the typefaces of the fonts indicate particular styles of lettering, such as, Times New Roman, Helvetica, Arial, Mincho, and Gothic. However, the printer data does not include information directly specifying the shape of the character. When rasterizing print data containing characters, the printer 1 uses information included in the built-in font information 22 and/or DL font information 23, i.e., information specifying the outlines of the characters.

Figure 2:
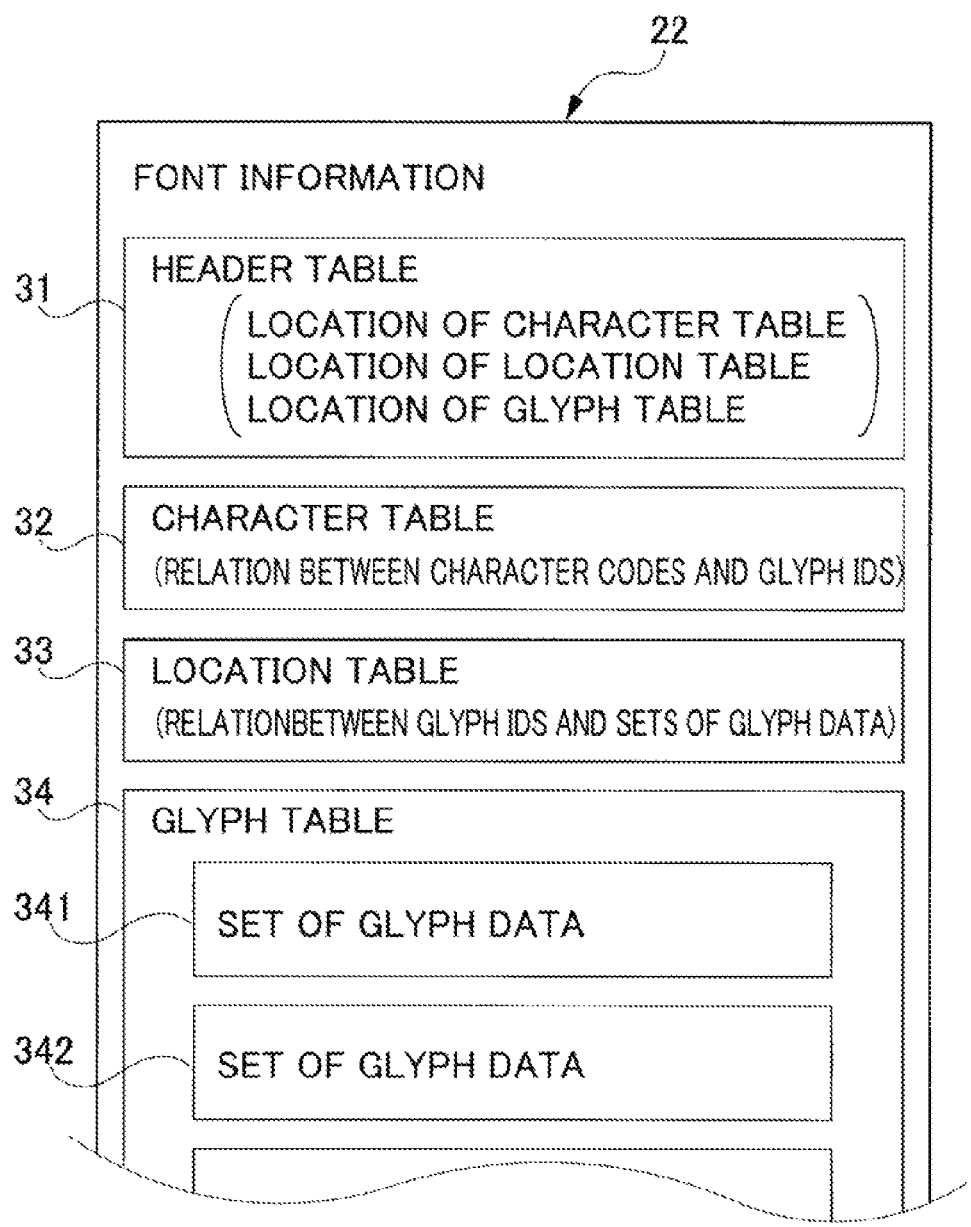
FIG. 2 is an explanatory diagram illustrating a structure of font information.

The built-in font information 22 provided in the printer 1 is stored in the TrueType font format, for example. As shown in FIG. 2, the built-in font information 22 includes a header table 31, a character table 32, a location table 33, and a glyph table 34, for example.

The header table 31 stores information including location information in the built-in font information for the character table 32, the location table 33, and the glyph table 34.

The character table 32 associates the character code of each character with a glyph ID for the same character. Each glyph ID is identification information that identifies a set of glyph data for a corresponding character. Each set of glyph data is information specifying the outline of the corresponding character and is assigned with a unique glyph ID.

The location table 33 maps each glyph ID to a piece of location information indicating the storage location in the glyph table 34 where a set of glyph data identified by the glyph ID is located.

In a case that the built-in font information 22 includes fonts for a plurality of typefaces, the built-in font may include: a plurality of character tables 32 for the typefaces and a plurality of location tables 33 for the typefaces. In this case, the combination of the typeface and the glyph ID uniquely identifies a set of glyph data and piece of location information corresponding to a target character of a target typeface. Alternatively, in a case that the built-in font information 22 includes fonts for a plurality of typefaces, a glyph ID may be uniquely assigned for each set of glyph data so that different glyph IDs may be assigned for sets of glyph data of different typefaces even if these sets of glyph data associated with the same character code.

The glyph table 34 stores a plurality of sets of glyph data 341, 342, . . . for respective ones of a plurality of glyphs.

The built-in font information 22 may also include information on a plurality of typefaces. In this case, the built-in font information 22 is provided with font information having the structure shown in FIG. 2 for each typeface. The built-in font information 22 may further include information indicating the printing position and character width for each character.

As described above, the various programs and data are stored in the nonvolatile first memory 121 while the printer 1 has not been started. Reading of information from a nonvolatile storage area takes longer than reading of information from a volatile storage area. Therefore, the printer 1 reads some of the information to be used for printing from the nonvolatile first memory 121 at startup and stores this information in the volatile second memory 122.

Specifically, the printer 1 develops the print control program 21 in the second memory 122 at startup. This enables the printer 1 to begin printing quickly when a print job is received. As part of the initial setup at startup, the printer 1 also constructs a glyph index of a first type for each typeface in the second memory 122 based on the built-in font information 22. A glyph index is a table for registering data of the plurality sets of glyph data included in the font information. The glyph index may be used for acquiring a set of glyph data associated with each character code on the basis of the character codes included in the print data, for example. Hereinafter, a glyph index of the first type will simply be called a "first index".

Figure 3:
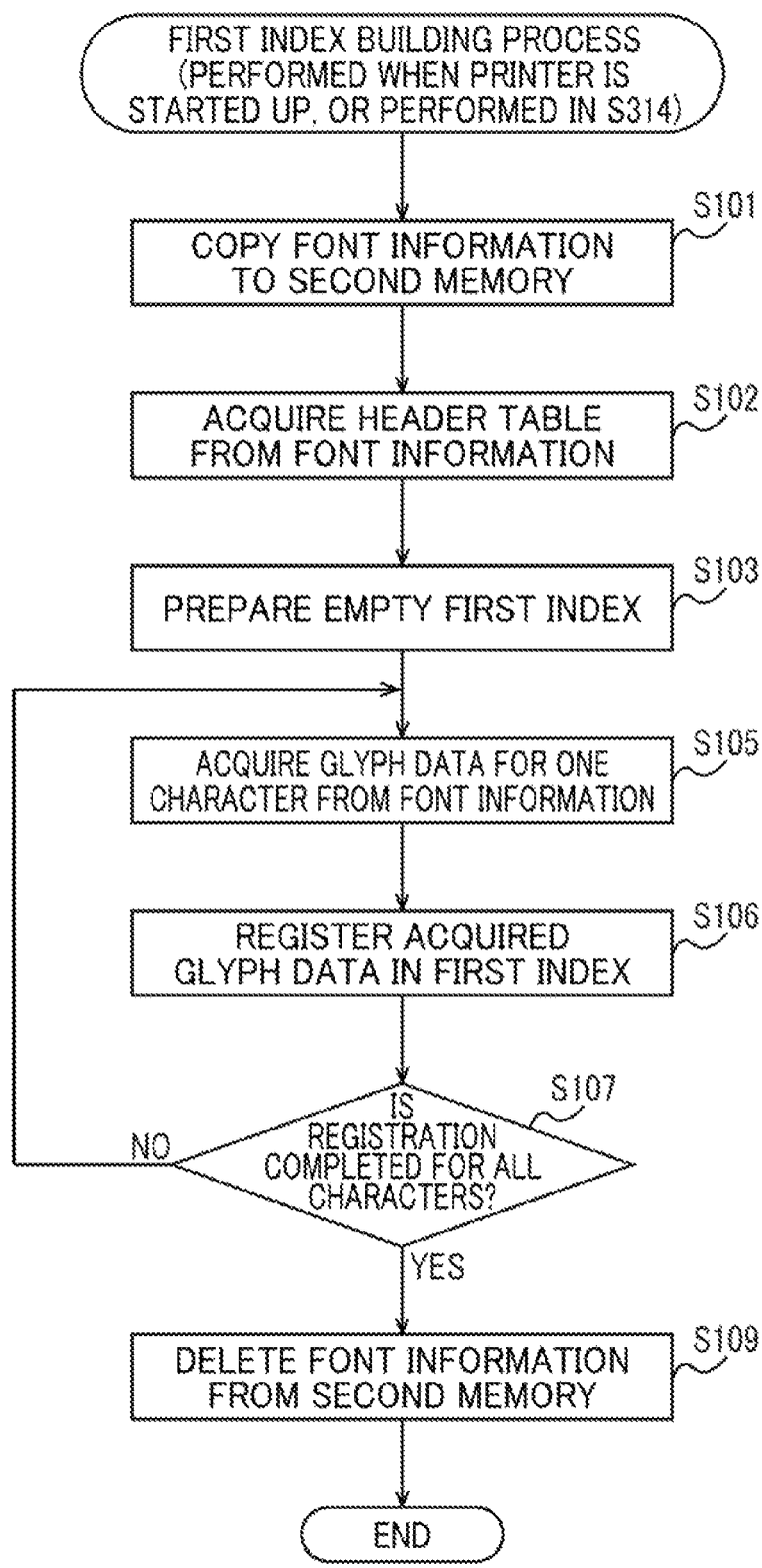
FIG. 3 is a flowchart illustrating a first index building process.

Next, steps in a first index building process will be described with reference to the flowchart in FIG. 3. The first index building process is performed to construct one or more first indices in the second memory 122 based on the built-in font information 22, for example. The CPU 11 executes the first index building process based on the built-in font information 22 when the printer 1 is started up, for example. Or, as described later, the CPU 11 also executes the first index building process based on the DL font information 23 when the process of S314 (FIG. 7) is performed. The first index building process performed when the printer 1 is started up is an example of an initial process.

In S101 at the beginning of the first index building process, the CPU 11 reads font information (the built-in font information 22 or the DL font information 23) from the first memory 121 for the font being processed and copies the font information to the second memory 122. In S102 the CPU 11 acquires the header table 31 from the font information read in S101. In S103 the CPU 11 prepares an empty first index in the second memory 122. That is, in S103, the CPU 11 defines the first index while no set of glyph data is registered therein. When the font information includes pluralities of sets of glyph data for a plurality of typefaces, in S103 the CPU prepares empty first indices for these typefaces.

Figure 4:
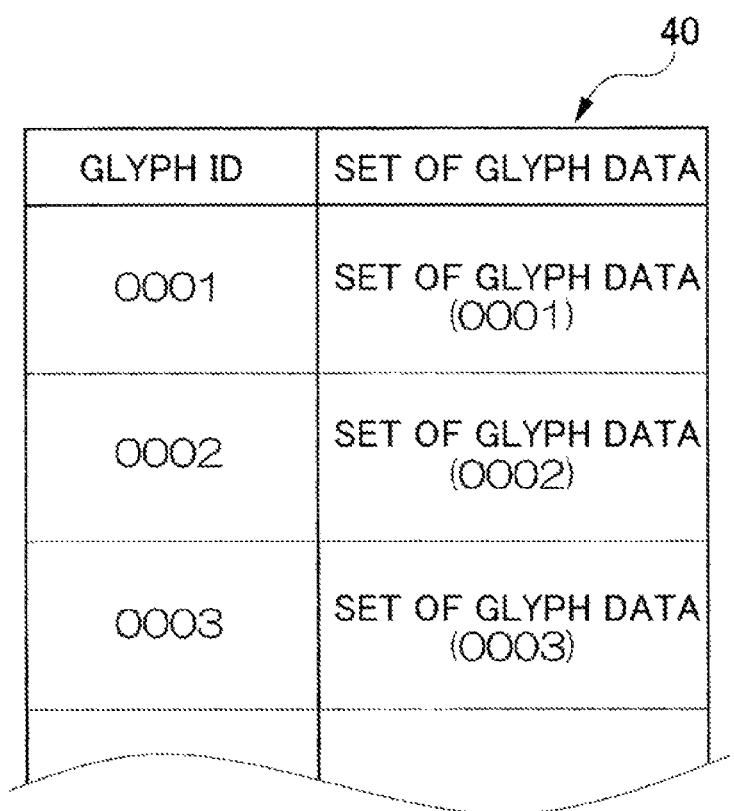
FIG. 4 is an explanatory diagram illustrating a structure of a first index.

FIG. 4 shows a sample first index 40. The first index 40 is a table that associates a glyph ID with a set of glyph data for each character. A plurality of sets of glyph data for characters can be stored in the first index 40 in the order of the glyph IDs, for example. The first index 40 that the CPU 11 prepares in S103 contains no set of glyph data. The first index 40 is an example of a glyph index table.

In S105 the CPU 11 acquires a set of glyph data for one character from the font information that has been copied to the second memory 122 in S101. In S106 the CPU 11 registers the acquired set of glyph data in the first index 40 corresponding to the typeface of the acquired set of glyph data so that the acquired set of glyph data is associated with a glyph ID in the corresponding first index 40. In S106 the CPU 11 may convert the set of glyph data as necessary to create a set of glyph data for record that is suitable for printing on the printer 1.

In S107 the CPU 11 determines whether the process in S105 and S106 has been completed for all characters in the font information copied to the second memory 122. While there is an unprocessed character (S107: NO), the CPU 11 repeats S105 and S106 for the next character.

Once the process in S105 and S106 has been completed for all characters in the copied font information (S107: YES), in S109 the CPU 11 deletes the font information copied in S101 from the second memory 122. After the process of S109 the CPU 11 ends the first index building process. Through this process, the CPU 11 builds the first index 40 that stores a set of glyph data for each character contained in this font information in the second memory 122.

Note that the printer 1 executes the first index building process for each typeface (each font) included in the built-in font information 22, constructing a first index 40 for each typeface (each font). These first indices 40 may be incorporated in a program that performs rasterization. The printer 1 may also store information mapping character codes to glyph IDs in the second memory 122 separate from the first indices 40.

The built-in fonts included in the built-in font information 22 are prepared on the printer 1 in advance as fonts that are likely to be used for printing. At startup, the printer 1 constructs one or more first indices 40 recording a plurality of sets of glyph data for all the fonts included in the built-in font information 22. Hence, the first indices 40 can be used for rasterization when printing. That is, the program that performs rasterization can acquire sets of glyph data for the characters being printed in a short amount of time on the basis of the first indices 40. Thus, the first indices 40 reduce processing time for printing. The program that performs rasterization may be included as part of the print control program 21 or may be a separate program from the print control program 21.

Figure 5:
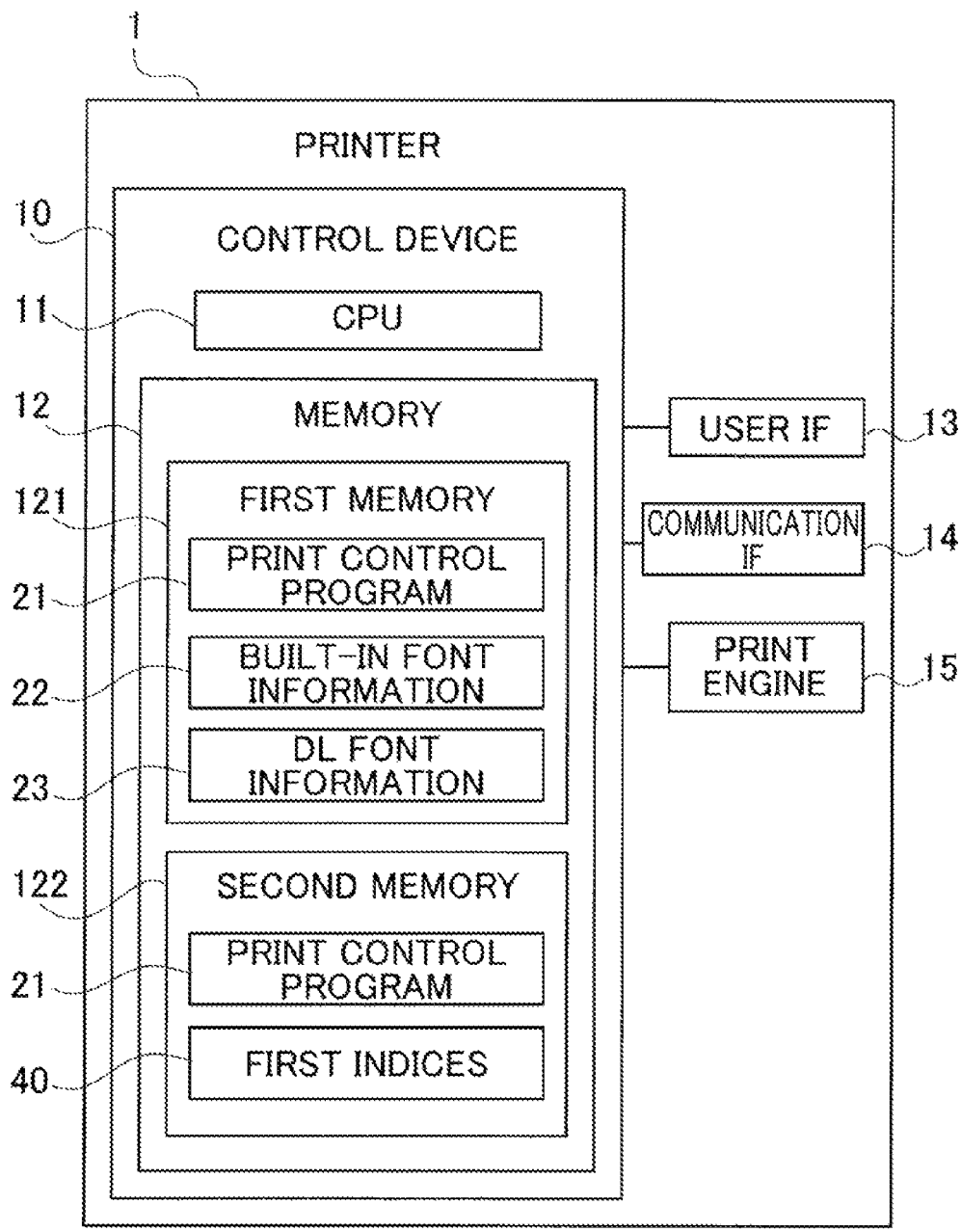
FIG. 5 is a block diagram illustrating an overview of the printer.

After the process on startup has been completed and while a print job has not been received, the print control program 21 and first indices 40 are stored in the second memory 122 of the printer 1, as illustrated in FIG. 5. However, at this time the no set of glyph data included in the DL font information 23 is not recorded in the second memory 122.

Next, steps in a printing process for processing a print job executed on the printer 1 will be described with reference to the flowchart in FIG. 6. The CPU 11 of the printer 1 executes this printing process according to the print control program 21 upon receiving an instruction to print a print job. The printer 1 may acquire a print job by receiving the print job from an external device via the communication interface 14 or by reading the print job from a USB memory mounted in the communication interface 14.

In S201 at the beginning of the printing process, the CPU 11 begins analyzing the received print job and acquires print data representing the image to be printed. The print job may include page description language (PDL) data, which is image data described in the PDL to represent the image being printed, and printer job language (PJL) data that specifies various printing-related parameters. The format of the PDL data is Printer Command Language (PCL) or Portable Document Format (PDF), for example. In S202 the CPU 11 selects one page defined in the print job as a subject of drawing, and allocates a memory area for writing an image for the selected page. The process of S201 is an example of a print data acquisition process.

In S211 the CPU 11 detects a drawing object in the selected page from the image data included in the print job. When a drawing object was detected, in S212 the CPU 11 sets the detected drawing object as a target object, and determines whether the target object (=detected drawing object) is a text object specifying the drawing of a character. In this example, the CPU 11 detects one character as one text object. When the CPU 11 determines that the detected object is a text object (S212: YES), in S215 the CPU 11 executes an intermediate character data generating process.

Steps in this intermediate character data generating process will be described with reference to the flowchart in FIG. 7. In S301 of the intermediate character data generating process, the CPU 11 acquires information on the typeface (font) designated in the detected text object. That is, the CPU 11 specifies the typeface designated in the detected text object. In S302 the CPU 11 determines whether a glyph index has been constructed for the typeface indicated in the acquired information. When the typeface designated in the detected text object is a built-in font, for example, the CPU 11 has already constructed a glyph index, i.e., a first index 40, for this typeface through the first index building process executed at startup.

When the CPU 11 determines that a glyph index has been constructed for the font to be printed (S302: YES), in S305 the CPU 11 determines the type of this glyph index. The printer 1 can use a glyph index of a second type configured differently from the first indices 40 described above (FIG. 4). Hereinafter, a glyph index of the second type will be called a "second index". In S305 the CPU 11 determines whether the constructed glyph index is a first index 40 or a second index. The second index will be described later in greater detail.

When the CPU 11 determines that the glyph index constructed for the font to be printed is a first index 40 (S305: first index), in S307 the CPU 11 executes a first retrieval process. The first retrieval process is performed using the constructed first index 40 to acquire a set of glyph data for the character in the target object to be printed. When the image data in the print job for which an execution instruction was received includes characters of a built-in font, for example, the printer 1 references a corresponding one of first indices 40 constructed at startup to acquire a set of glyph data for each of the characters to be printed.

Figure 8:
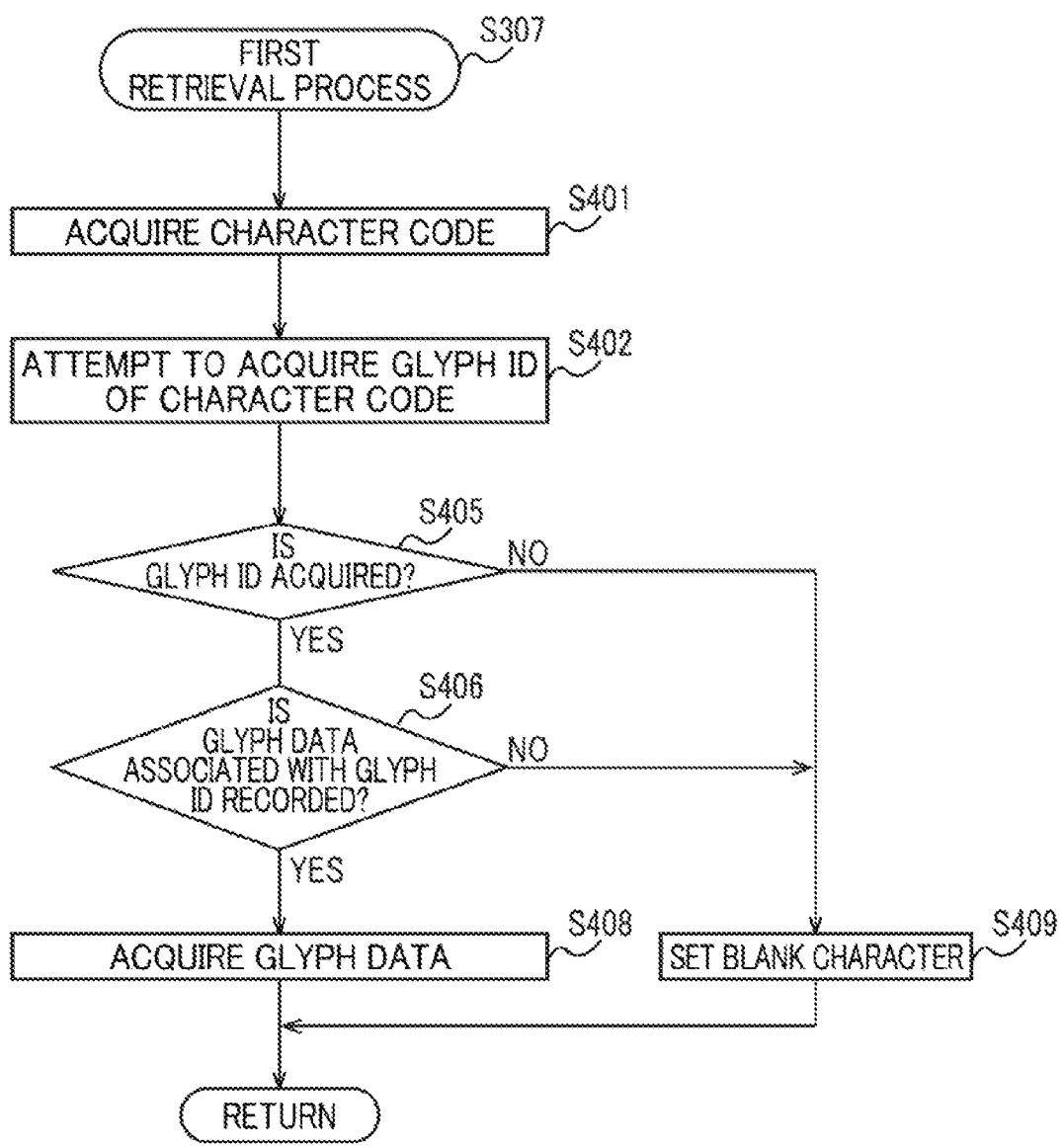
FIG. 8 is a flowchart illustrating a first retrieval process.

Steps in the first retrieval process will be described with reference to the flowchart in FIG. 8. In S401 of the first retrieval process, the CPU 11 acquires the character code for the character in the target object to be printed. The character code for the character to be printed is specified in the target object. In S402 the CPU 11 attempts to acquire a glyph ID associated with the character code. Information mapping character codes to glyph IDs is maintained in the second memory 122 separate from the first index 40.

In S405 the CPU 11 determines whether the glyph ID has been acquired. When the CPU 11 determines that glyph ID has been acquired (S405: YES), in S406 the CPU 11 determines whether a set of glyph data associated with the acquired glyph ID is recorded in a first index 40 corresponding to the typeface for the target object. When the CPU 11 determines that the first index 40 has a set of glyph data associated with the glyph ID (S406: YES), in S408 the CPU 11 acquires this set of glyph data from the first index 40. A series of the processed of S405 and S406 is an example of a first determination process. The process of S408 is an example of a second glyph data acquisition process.

When the CPU 11 determines that glyph ID cannot be obtained (S405: NO) or when the CPU 11 determines that the first index 40 has no set of glyph data associated with the glyph ID (S406: NO), in S409 the CPU 11 sets the character for the target object to be printed to a blank character. Note that rather than specifying a blank character, the CPU 11 may obtain a set of glyph data indicating a predetermined special symbol. After completing step S408 or S409, the CPU 11 ends the first retrieval process and returns to the intermediate character data generating process. The process of S409 is an example of an alternative process. The blank character is an example of a specific character.

When there is no glyph ID associated with the character code in the print data or when there is no set of glyph data associated with the glyph ID, the printer 1 cannot print the character properly. In such a case, the printer 1 prints a character based on a specific set of glyph data that has been preset, such as a blank character. Thus, the printer 1 can avoid printing an image in which the character has been removed entirely and the character before or after the removed character has been shifted together.

Figure 7:
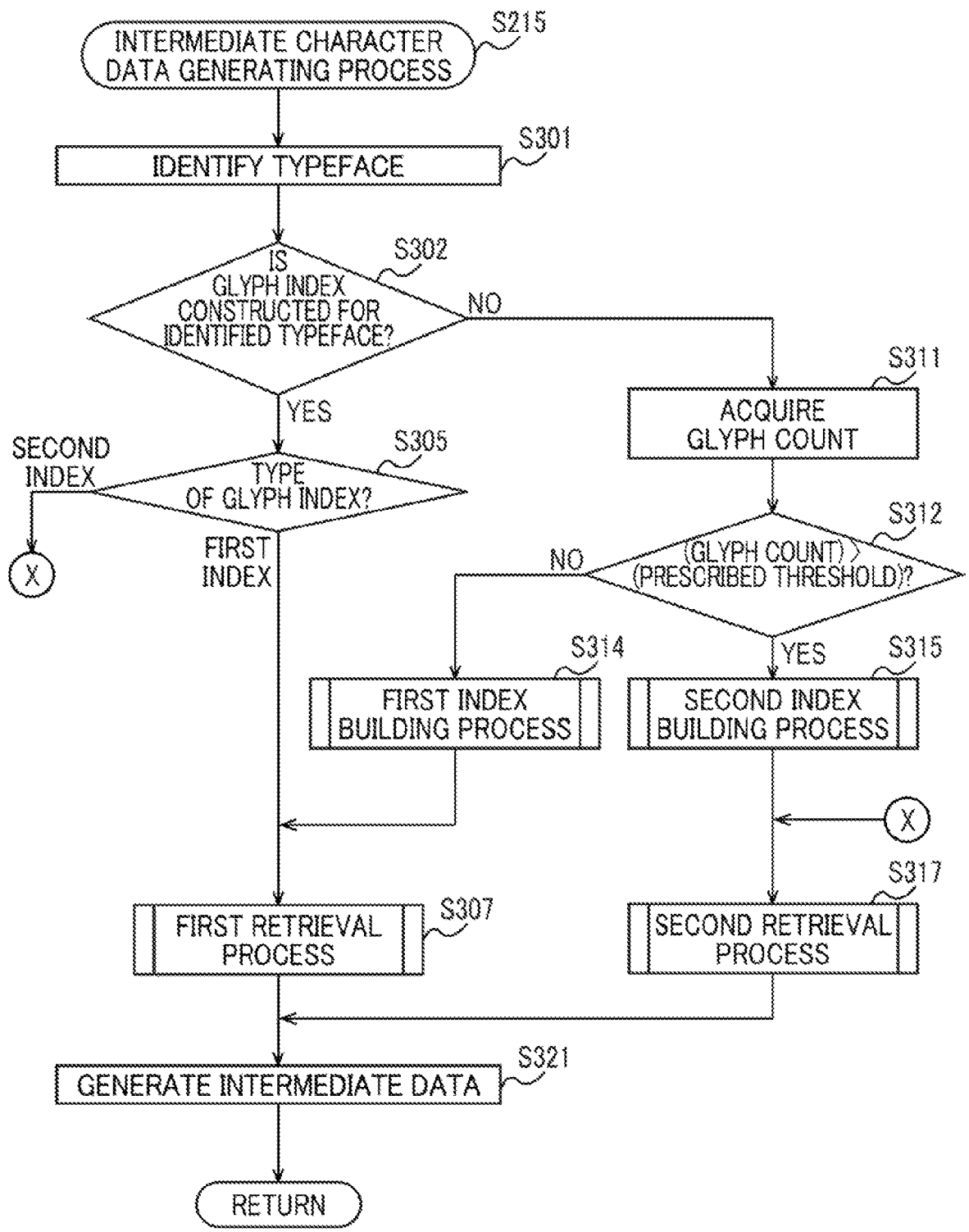
FIG. 7 is a flowchart illustrating an intermediate character data generating process.

Returning to the intermediate character data generating process of FIG. 7, when the CPU 11 determines in S302 that no glyph index has been constructed for the typeface (font) acquired in S301 (S302: NO), in S311 the CPU 11 acquires a glyph count for the acquired typeface. The glyph count is information specifying the number of types of characters included in the font, i.e., the number of glyphs or the number of sets of glyph data for the typeface. Information on the glyph count is included in the DL font information 23. As described above, the CPU 11 executes the first index building process when the printer 1 is started up for each typeface (font) included in the built-in font information 22. In other words, typefaces for which the CPU 11 determines in S302 no glyph index was constructed are fonts included in the DL font information 23.

In S312 the CPU 11 determines whether the acquired glyph count is larger than a prescribed threshold. The prescribed threshold may be 1000, for example. When the CPU 11 determines that the glyph count is not greater than the prescribed threshold (S312: NO), in S314 the CPU 11 executes the first index building process shown in FIG. 3 on the basis of font information for this font. The process of S312 is an example of a third determination process. The process of S314 is an example of a second building process.

Specifically, in S314 the CPU 11 reads font information from the DL font information 23 for the typeface acquired in S301 and constructs a first index 40 in the second memory 122 having the same structure as that shown in FIG. 4 and storing all the sets of glyph data for the typeface. The CPU 11 then advances to S307 and uses the first index 40 constructed in S314 to execute the first retrieval process shown in FIG. 8.

When the glyph count is low, not much time is required to construct a first index 40 recording all sets of glyph data for that font (typeface). Therefore, the printer 1 can start printing quickly, even when having to construct a first index 40 after the print job is received. Further, once the first index 40 is constructed, the first index 40 can be used thereafter to obtain sets of glyph data for characters in this font. In other words, the first index 40 will reduce the process load required for printing characters in the same font.

On the other hand, when the CPU 11 determines that the glyph count is greater than the prescribed threshold (S312: YES), in S315 the CPU 11 executes a second index building process. The second index building process is performed to construct a second index for the typeface (font) acquired in S301 on the basis of the DL font information 23. The second index is constructed for each typeface. So, in a case that different typefaces are acquired in S301 while the processes S202-S224 (especially S215) are repeatedly executed, the CPU 11 constructs the second indices for the typefaces in S315.

Figure 9:
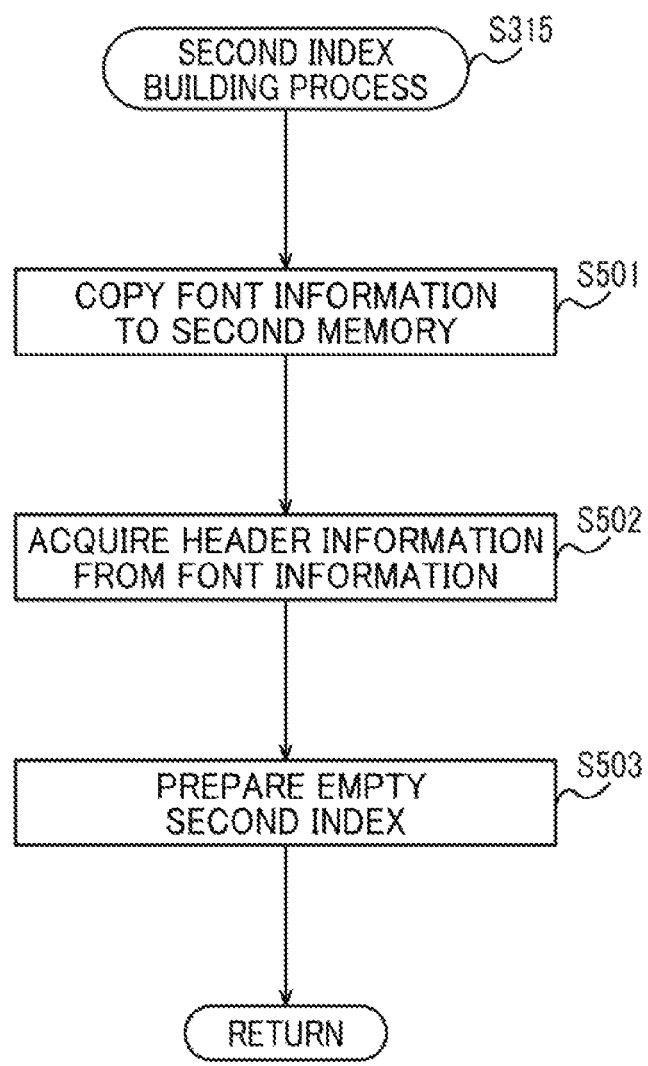
FIG. 9 is a flowchart illustrating a second index building process.

Steps in the second index building process will be described with reference to the flowchart in FIG. 9. The CPU 11 executes the second index building process when the typeface (font) specified for a text object in the print data is a typeface included in the DL font information 23. When the specified typeface is for a font not included in either the built-in font information 22 or the DL font information 23, the printer 1 displays an error message, for example, and does not execute printing.

In S501 (FIG. 9) of the second index building process, the CPU 11 reads font information corresponding to the typeface acquired in S301 from the DL font information 23 stored in the first memory 121 and copies this font information to the second memory 122. In S502 the CPU 11 acquires header information from the font information read in S501. The DL font information 23 has the same structure as the built-in font information 22 shown in FIG. 2. The header information is information included in the header table, character table, and location table of the font information. The process of S501 is an example of a reading process.

In S503 the CPU 11 prepares an empty second index for the typeface (font) acquired in S301 in the second memory 122. That is, the CPU 11 defines a second index with no set of glyph data being registered therein. Subsequently, the CPU 11 ends the second index building process and returns to the intermediate character data generating process of FIG. 7. After completing the second index building process, the second memory 122 holds the font information read in S501 and the empty second index created in S503. The DL font information 23 stored in the second memory in S501 is maintained after the process of S503 is completed, and thus the glyph table, the character table, and the location table included in the DL font information 23 are maintained in the second memory. The process of S503 is an example of a building process.

Figure 10:
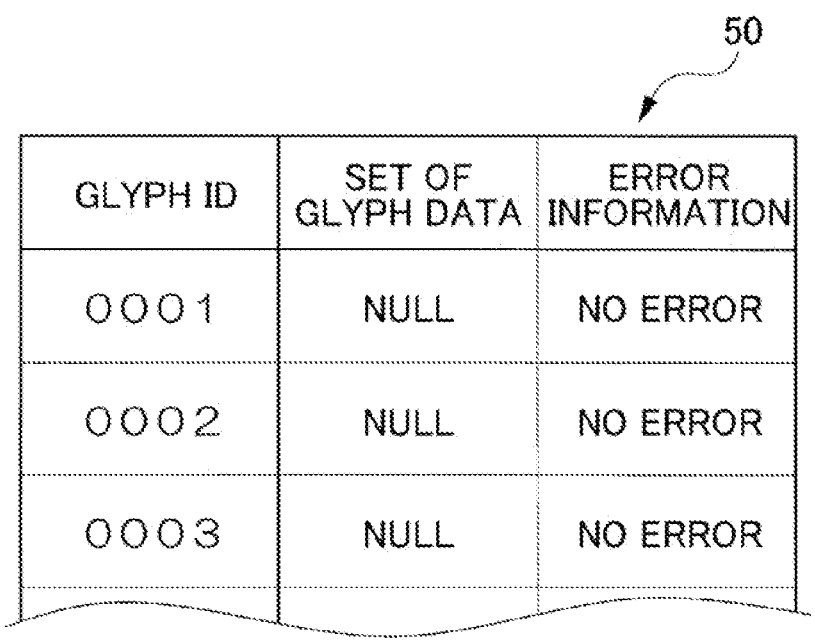
FIG. 10 is an explanatory diagram illustrating a structure of a second index.

Here, the structure of the second index will be described. FIG. 10 shows a sample second index 50. The second index 50 is a table associating glyph IDs with sets of glyph data and error information. The second index 50 is an example of the glyph index table.

In the second index 50 constructed in S503 of the second index building process, all sets of glyph data are null data and all error information specifies "no error". The empty second index 50 may store only glyph IDs of a number corresponding to the glyph count, for example. The CPU 11 sets a size for the second index 50 on the basis of the glyph count and allocates a storage area of this size.

Returning to the intermediate character data generating process of FIG. 7, after the CPU 11 constructs the empty second index 50 in the second index building process of S315 or when the CPU 11 determines that the constructed glyph index is a second index (S305: second index), in S317 the CPU 11 executes a second retrieval process. The second retrieval process is performed to obtain a set of glyph data for the character of the typeface (font) acquired in S301 in the target object to be printed using the second index 50.

Figure 11:
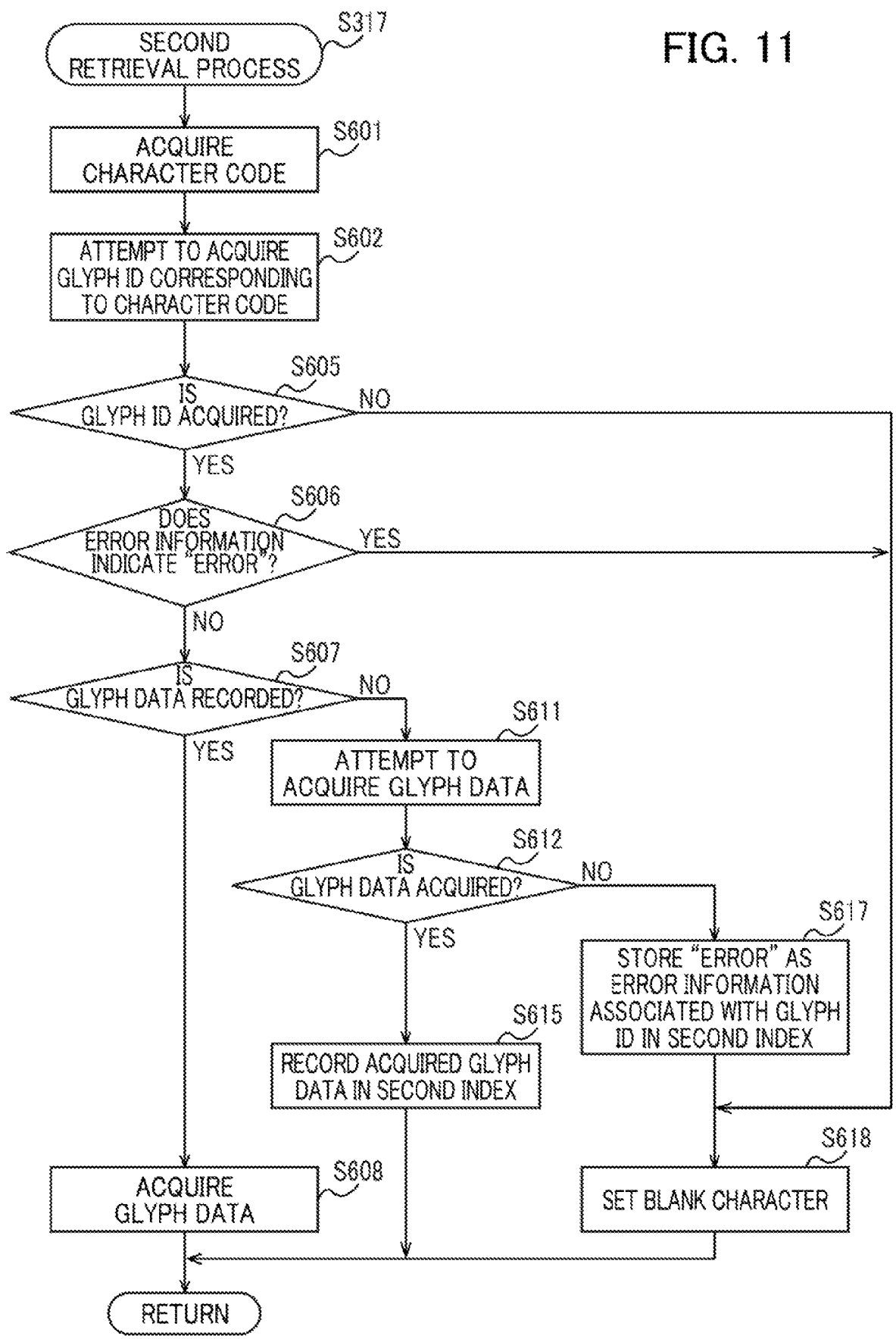
FIG. 11 is a flowchart illustrating a second retrieval process.

Steps in the second retrieval process will be described with reference to the flowchart in FIG. 11. In S601 of FIG. 11, the CPU 11 acquires the character code for the characters to be printed. The character code for characters to be printed is specified in the text object (target object). In S602 the CPU 11 attempts to acquire the glyph ID associated with the character code acquired in S601. The CPU 11 attempts to obtain the corresponding glyph ID on the basis of the character table in the font information maintained in the second memory 122 (FIG. 2), that is, the character table included in the header information acquired in S502, for example.

In S605 the CPU 11 determines whether the glyph ID has been obtained. When the CPU 11 determines that the glyph ID has been obtained (S605: YES), in S606 the CPU 11 determines whether information specifying "error" is stored in the error information of the second index 50 in association with the glyph ID. The process of S606 is an example of a second determination process. Information indicating "error" ("occurrence of presence of error") is information specifying that no set of glyph data corresponding to the glyph ID exists. Information indicating "error" is an example of error information.

When information indicating "error" is not stored in the error information of the second index 50 (S606: NO), in S607 the CPU 11 determines whether a set of glyph data corresponding to the acquired glyph ID is recorded in the second index 50. When the CPU 11 determines that the set of glyph data is recorded (S607: YES), in S608 the CPU 11 acquires this set of glyph data from the second index 50. The process of S607 is an example of a first determination process. The process of S608 is an example of a second glyph data acquisition process.

However, when the CPU 11 determines that no set of glyph data corresponding to the acquired glyph ID has been recorded in the second index 50 (S607: NO), in S611 the CPU 11 attempts to obtain the set of glyph data corresponding to the acquired glyph ID of the typeface (font) acquired in S301 from the font information stored in the second memory 122. The CPU 11 may reference the location table 33 stored in the second memory 122 to specify the location of the set of glyph data corresponding to the acquired glyph ID and acquires the set of glyph data from the glyph table 34 on the basis of the specified location. In S612 the CPU 11 determines whether the set of glyph data has been obtained. The process of S611 is an example of a first glyph data acquisition process. The process of S612 is an example of a searching process.

When the CPU 11 determines that the set of glyph data has been obtained (S612: YES), in S615 the CPU 11 records the set of glyph data acquired in S611 in the second index 50. Here, when the glyph ID for the character in question is not stored in the second index 50, the CPU 11 records both the glyph ID and the set of glyph data in association with each other. The CPU 11 also sets the set of glyph data acquired in S611 as a set of glyph data to be used for rasterization. The process of S615 is an example of a recordation process.

However, when the CPU 11 determines that the set of glyph data cannot be obtained (S612: NO), in S617 the CPU 11 stores information indicating "error" as error information associated with the glyph ID in the second index 50. In other words, when the CPU 11 cannot acquire the set of glyph data from the font information for the character in the target object to be printed, the CPU 11 stores information indicating "error" in association with the character code and glyph ID for the character by overwriting the information indicating "no error". In this way, when the print data includes character codes for the same characters, thereafter the CPU 11 will reach a YES determination in S606, eliminating the need to retrieve the font information again. Accordingly, this method requires less processing time than when the font information is retrieved each time. The process of S617 is an example of a storing process.

After completing the process in S617 or when the CPU 11 determines in S605 that glyph ID has not been obtained (S605: NO) or when the CPU 11 determines in S606 that information indicating "error" has been stored in association with the glyph IDs (S606: YES), in S618 the CPU 11 sets the character for the target object to be printed to a blank character. After completing the process of S608, S615, or S618, the CPU 11 ends the second retrieval process and returns to the intermediate character data generating process of FIG. 7. The process of S618 is an example of an alternative process.

Returning to the description of the intermediate character data generating process in FIG. 7, after completing the first retrieval process in S307 or the second retrieval process in S317, in S321 the CPU 11 generates a set of intermediate data for the character of the target object. The CPU 11 generates the set of intermediate data for the character based on the set of glyph data or blank character data obtained in the first retrieval process of S307 or the second retrieval process of S317. After the process in S321, the CPU 11 ends the intermediate character data generating process and returns to the printing process.

Figure 6:
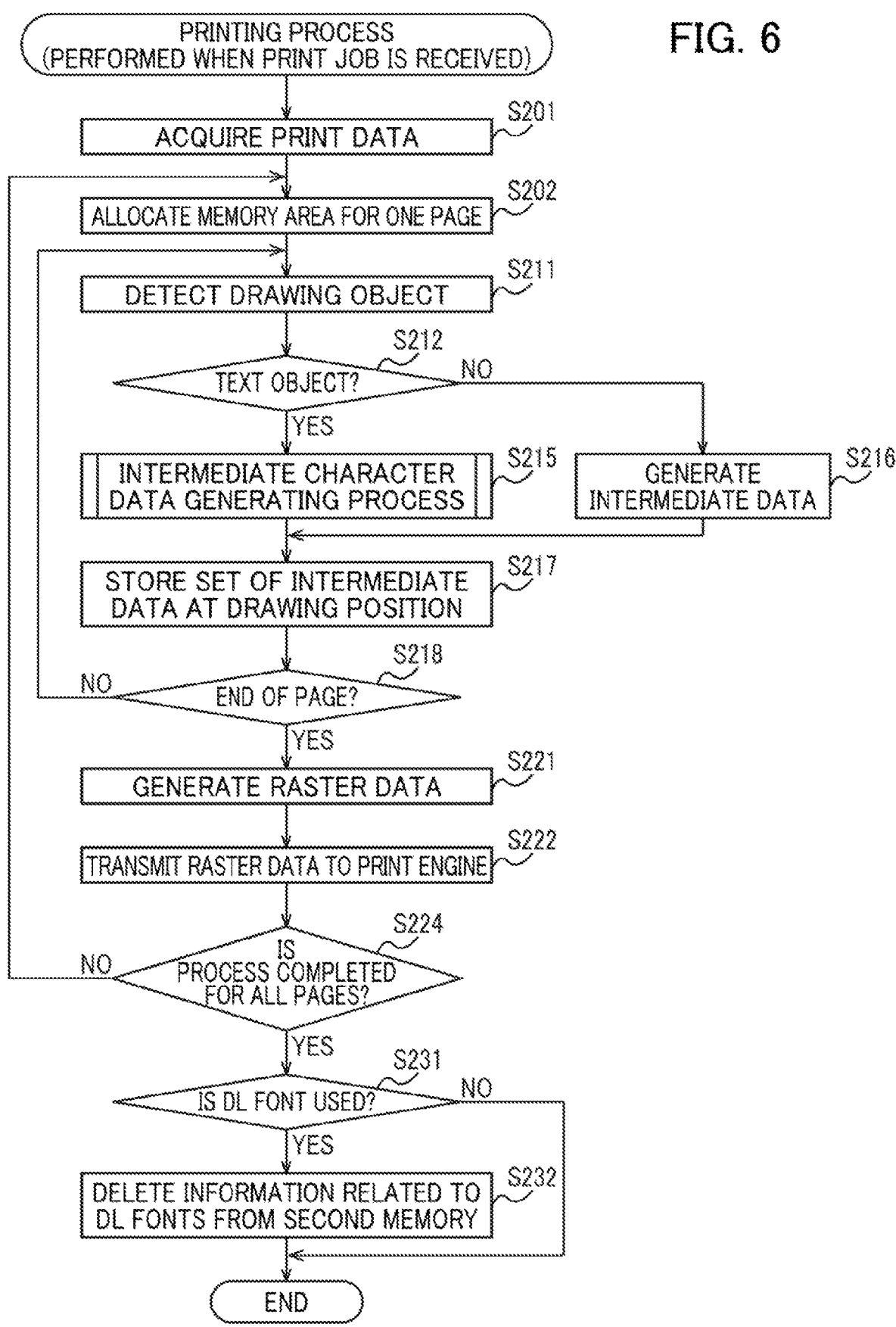
FIG. 6 is a flowchart illustrating a printing process.

Returning to the description of the printing process in FIG. 6, when the CPU 11 determines that the detected drawing object is not a text object (S212: NO), in S216 the CPU 11 generates a set of intermediate data for the detected object. Irrespective of whether the CPU 11 has generated the set of intermediate data in S321 of the intermediate character data generating process of S215 or has generated the set of intermediate data in S216, in S217 the CPU 11 stores the set of intermediate data at a drawing position in the memory area allocated in S202.

In S218 the CPU 11 determines whether data indicating the end of page has been acquired. While the CPU 11 determines the end of page has not been detected (S218: NO), the CPU 11 performs again the process in S211-S217 on another unprocessed drawing object included in the image data for the currently selected page to generate a set of intermediate data for one page. By performing the process in S211-S217 repeatedly, the CPU 11 generates all the sets of intermediate data for the currently selected page.

Once the end of page has been determined (S218: YES), in S221 the CPU 11 generates raster data based on the sets of intermediate data generated for the currently selected page, and in S222 passes the raster data to the print engine 15. Here, the print engine 15 executes printing based on the raster data received from the CPU 11. The process of S222 is an example of a printing process.

Next, the CPU 11 determines whether printing has been completed for the received print job. Specifically, in S224 the CPU 11 determines whether all pages in the print job have been processed. While the CPU 11 determines that there is an unprocessed page (S224: NO), the CPU 11 returns to S202 and repeats the above process on image data for the next page. Note that the CPU 11 may determine that printing is complete after print data for all pages has been passed to the print engine 15, even when the print engine 15 has not completed printing.

Once the CPU 11 determines that processing has been completed for the print job (S224: YES), in S231 the CPU 11 determines whether any fonts included in the DL font information 23 have been used in this printing process. When the CPU 11 determines that any DL font has been used (S231: YES), in S232 the CPU 11 deletes information related to the DL fonts from the second memory 122. Specifically, the CPU 11 deletes first indices 40 or second indices 50 constructed on the basis of the DL font information 23 and the font information stored in the second memory 122. The process of S232 is an example of a glyph index table deletion process and an example of a font information deletion process.

It is unlikely that the same DL fonts used in one print job will be used in subsequent print jobs. Hence, the printer 1 can reduce the load on the second memory 122 by deleting the various information constructed on the basis of the DL font information 23 from the second memory 122 after printing based on the print job is completed. On the other hand, fonts in the built-in font information 22 are highly likely to be reused. Therefore, the CPU 11 does not delete first indices 40 for built-in fonts from the second memory 122 after printing based on the print job is completed, enabling the printer 1 to begin printing the next print job in which built-in fonts are selected.

Following the process of S232 or when the CPU 11 determines in S231 that no DL fonts have been used in the print job (S231: NO), the CPU 11 ends the printing process. After completing the printing process, the second memory 122 in the printer 1 is in the state shown in FIG. 5, storing first indices 40 for built-in fonts and not storing any information on DL fonts. In a case that the printer 1 receives a new print job after completing the printing process, the printer 1 repeats the printing process of FIG. 6 based on the newly acquired print data.

As described in detail above, when the printer 1 of the embodiment acquires print data with DL fonts selected therein, the printer 1 only reads the DL font information 23 into the second memory 122 but registers no set of glyph data in a glyph index, i.e., does not perform mapping at the time that the DL font information 23 is read. Subsequently, for rasterizing the print data, the printer 1 then acquires, from the DL font information 23 in the second memory, only sets of glyph data corresponding to the character codes included in the print data. Each time a set of glyph data is acquired, the printer also records the set of glyph data in the second index 50 and thereafter acquires the set of glyph data for the same character from the second index 50 rather than the DL font information 23. This eliminates the time required for mapping the sets of glyph data so that the printer 1 can begin printing earlier than if rasterization would be performed after mapping all the sets of glyph data in the DL font information 23.

For example, when the printer 1 receives print data that uses a DL font, the printer 1 could conceivably construct a glyph index mapping all the sets of glyph data included in the DL font information for the DL font to be used. However, some DL fonts contain sets of glyph data for more than 10,000 types of glyphs. Consequently, the time required to map all the sets of glyph data for so many fonts would increase the wait time before printing starts. Therefore, when a DL font having a large glyph count is selected in the embodiment, the printer 1 does not perform mapping at the time the font is selected so that the printer 1 can be expected to start printing earlier. On the other hand, when the printer 1 selects an object having a DL font with a low glyph count (when the process of S211 is performed and thereafter YES determination is made in S215), the printer 1 performs mapping of the selected font. This mapping can be expected to reduce the time required to complete printing.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the printer is not limited to a device having a printing function only, but may be any device having another function as well as a printing function, such as, a multifunction peripheral, a copier machine, and a facsimile machine.

The configurations of font information and glyph indices described in this specification are merely examples and the font information and glyph indices are not limited to these configurations. For example, while error information is stored in the second index 50 in association with each glyph ID (see FIG. 10) in the embodiment, error information need not be stored in the second index 50. In other words, the second index 50 may have the same structure as the first index 40 (see FIG. 4). However, providing such error information in association with glyph IDs can prevent the printer 1 from repeating searches for characters for which sets of glyph data has previously been found not to exist, thereby reducing processing time.

In the above embodiment, error information indicating "no error" is stored in the second index 50 in association with each glyph ID when the printer 1 constructs an empty second index 50 (S503 of the second index building process), but the error information stored in the empty second index 50 may simply be null data. Further, the printer 1 overwrites the information indicating "no error" with information indicating "error" when no set of glyph data is found for the corresponding character (S617 of the second retrieval process), but the printer 1 may simply erase the information indicating "no error".

In the above embodiment, the printer 1 determines whether to construct a first index 40 or to construct a second index 50, on the basis of the glyph count in the DL font in S312 of the intermediate character data generating process, but the printer 1 need not make this determination. That is, the printer 1 may construct a second index 50 for a DL font in all cases regardless of the glyph count. In this case, steps S311, S312, and S314 are omitted from the intermediate character data generating process and the CPU 11 advances to S315 upon reaching a NO determination in S302.

In the above embodiment, the printer 1 deletes second indices 50 and the DL font information 23 stored in the second memory 122 upon ending a printing process (S231 and S232 in the printing process), but the printer 1 need not delete this data. For example, the printer 1 may leave the second indices 50 and/or the DL font information to be used in subsequent print jobs.

In the above embodiment, the printer 1 constructs first indices 40 for built-in fonts upon startup (the first index building process), but the printer 1 need not construct first indices 40 at this time. In other words, the printer 1 may construct first indices 40 for built-in fonts upon determining a font is used in the print data.

In any of the flowcharts disclosed in the embodiment, the plurality of processes that makes up any of a plurality of steps may be executed in parallel, or the order in which the processes are performed may be modified in any way that does not produce any inconsistencies in the processes.

The processes disclosed in the embodiment may be performed by a single CPU, a plurality of CPUs, hardware such as one or more application specific integrated circuits (ASICs) or any combination of these. The processes disclosed in the embodiment may be implemented through various manners, such as a recording medium storing program instructions for the processes, or a method defining the processes.

What is claimed is:

1. A printer comprising:
a first memory;
a second memory; and
a controller,
wherein the first memory is a nonvolatile memory and the second memory is a volatile memory,
wherein the controller is configured to perform:
acquiring print data written in a page description language, the print data representing an image including a character, wherein a character code of the character and a font used for representing the character are selected in the print data;
copying, when font information on the font selected in the print data is stored in the first memory, the font information from the first memory to the second memory, the font information including a plurality of sets of glyph data each specifying an outline of a corresponding character for the font;
a first building process to build, in the second memory, a glyph index table in which no set of glyph data is registered, wherein each of the plurality of sets of glyph data can be registered in the glyph index table;
a first determination process to determine whether a set of glyph data corresponding to the character code selected in the print data is registered in the glyph index table;
a first glyph data acquiring process on a first condition including a condition that the first determination process determines that no set of glyph data corresponding to the character code is registered in the glyph index table, the first glyph data acquiring process being to acquire a target set of glyph data from the font information in the second memory, the target set of glyph data being the set of glyph data corresponding to the character code;
registering the target set of glyph data acquired in the first glyph data acquiring process in the glyph index table when the first glyph data acquiring process is performed;
a second glyph data acquiring process on a second condition that the first determination process determines that the set of glyph data corresponding to the character code is registered in the glyph index table, the second glyph data acquiring process being to acquire the target set of glyph data from the glyph index table;
a rasterizing process to generate raster data based on the print data using the target set of glyph data; and
a printing process to print an image based on the raster data.

2. The printer according to claim 1, wherein the font information includes:
a glyph table storing the plurality of sets of glyph data;
a character table in which a plurality of character codes is associated with respective ones of a plurality of glyph identifiers (IDs), the plurality of glyph IDs being for identifying respective ones of the plurality of sets of glyph data; and a location table in which the plurality of glyph IDs is associated with respective ones a plurality of storage locations, the storage location associated with each glyph ID being a storage location in the glyph table where a set of glyph data identified by the glyph ID is located, wherein each of the plurality of sets of glyph data can be associated with a corresponding one of the plurality of glyph IDs in the glyph index table, wherein the font information including the glyph table, the character table, and the location table are maintained in the second memory after the first building process is performed, wherein the first glyph data acquiring process acquires the target set of glyph data using the glyph table and the location table maintained in the second memory, wherein the registering includes:

specifying the glyph ID associated with the character code selected in the print data by using the character table maintained in the second memory; and registering the specified glyph ID in the glyph index table in association with the target set of glyph data acquired in the first glyph data acquiring process.

3. The printer according to claim 1, wherein the controller is configured to further perform:

searching the font information stored in the second memory for the set of glyph data corresponding to the character code selected in the print data when the first determination process determines that no set of glyph data corresponding to the character code selected in the print data is registered in the glyph index table; and acquiring a prescribed set of glyph data when no set of glyph data corresponding to the character code selected in the print data is found in the searching, wherein the acquired prescribed set of glyph data is to be used in the rasterizing process instead of the target set of glyph data, wherein on the first condition further including a condition that the set of glyph data corresponding to the character code selected in the print data is found in the searching, the controller performs the first glyph data acquiring process to acquire the found set of glyph data as the target set of glyph data.

4. The printer according to claim 3, wherein the controller is configured to further perform:

storing error information in the second memory when no set of glyph data corresponding to the character code selected in the print data is found in the searching, the error information indicating that no set of glyph data corresponding to the character code selected in the print data has been found in the searching; and a second determination process when the print data is acquired in the acquiring, the second determination process being to determine whether the error information is stored in the second memory, wherein when the second determination process determines that the error information is not stored in the second memory, the controller performs the first determination process, wherein when the second determination process determines that the error information is stored in the second memory, the controller does not perform the first determination process.

5. The printer according to claim 1, wherein the controller is configured to further perform:

deleting the glyph index table from the second memory when the rasterizing process is completed; and the first building process again in a case that font information on a font selected in newly acquired print data is stored in the first memory after the deleting is performed.

6. The printer according to claim 1, wherein the controller is configured to further perform:

deleting the font information from the second memory when the rasterizing process is completed; and copying, when font information on a font selected in newly acquired print data is stored in the first memory after the deleting is performed, the font information on the font selected in the newly acquired print data from the first memory to the second memory.

7. The printer according to claim 1, wherein the font information includes information on the number of sets of glyph data included in the font information, wherein the controller is configured to further perform:

a second determination process to determine whether the number of sets of glyph data is larger than a threshold value; and a second building process when the number of sets of glyph data is smaller than or equal to the threshold value, the second building process being to build, in the second memory, a glyph index table in which all of the sets of glyph data included in the font information are registered, wherein when the number of sets of glyph data is larger than the threshold value, the controller performs the first building process.

8. The printer according to claim 7, wherein the controller is configured to further perform:

the first determination process when the print data is acquired in the acquiring, the number of sets of glyph data is smaller than or equal to the threshold value, and the second building process is performed;

acquiring a prescribed set of glyph data when the second building process is performed and the first determination process determines that no set of glyph data corresponding to the character code is registered in the glyph index table, wherein the acquired prescribed set of glyph data is to be used in the rasterizing process instead of the target set of glyph data; and the second glyph data acquiring process when the second building process is performed and the first determination process determines that the set of glyph data corresponding to the character code is registered in the glyph index table.

9. The printer according to claim 1, wherein the first memory stores in advance built-in font information, the built-in font information being information on a built-in font and including a plurality of sets of built-in glyph data each specifying an outline of a corresponding character for the built-in font, wherein the font information is acquired from an external device after shipment of the printer, wherein the controller is configured to further perform:

an initial process when the controller performs a startup operation of the printer, the initial process being to copy the built-in font information from the first memory to the second memory, and to build, in the second memory, a built-in glyph index table in which all the plurality of sets of built-in glyph data included in the built-in font information are registered, wherein when the font information on the font selected in the print data is stored in the first memory from the external device, the controller performs the copying the font information, wherein when the font selected in the print data is the built-in font, the controller performs neither the copying the font information nor the first building process.

10. The printer according to claim 9, wherein the controller is configured to further perform:
- a third determination process when the font selected in the print data is the built-in font, the third determination process being to determine whether a set of built-in glyph data corresponding to the character code selected in the print data is registered in the built-in glyph index table;
- acquiring a prescribed set of glyph data when the third determination process determines that no set of glyph data corresponding to the character code selected in the print data is registered in the built-in glyph index table, wherein the acquired prescribed set of glyph data is to be used in the rasterizing process instead of the target set of glyph data; and
- acquiring the set of built-in glyph data corresponding to the character code from the built-in glyph index table when the third determination process determines that the set of built-in glyph data corresponding to the character code selected in the print data is registered in the built-in glyph index table, wherein the acquired set of built-in glyph data is to be used in the rasterizing process instead of the target set of glyph data.

* * * * *